Patented Dec. 26, 1933

1,940,815

UNITED STATES PATENT OFFICE 1,940,815

RUBBER COMPOSITION AND METHOD OF PRESERVING RUBBER

Waldo L. Semon, Cuyahoga Falls, Ohio, assignor to The B. F. Goodrich Company, New York, N. Y., a corporation of New York No Drawing. Application May 29, 1928, Serial No. 281,585. Renewed October 5, 1933

23 Claims. (Cl. 18—50)

This invention relates to the art of preserving rubber, either in a vulcanized or unvulcanized condition, and to rubber compositions so preserved.

It is well known that rubber gradually loses its strength and resiliency, particularly when exposed to light, air, and heat, such deterioration being commonly attributed to an oxidation of the rubber or the rubber composition. The purpose of the present invention is to provide a method for preserving rubber, and particularly vulcanized rubber, so that it will resist the effects of aging more effectively, and to provide a rubber composition which shall have superior age-resisting properties.

The present invention, briefly stated, consists in the treatment of rubber, before or after vulcanization, with a compound of a class which has been found to be unusually effective in retarding the deterioration of a rubber composition on aging. This class of compounds includes the disubstituted p-phenylene-diamines, which may be generally represented by the structural formula:

the groups $R_1$ and $R_2$ being aryl or alkyl groups or substituted aryl or alkyl groups. For example, if $R_1$ is a phenyl group and $R_2$ is a p-diphenyl-amine group, the compound is phenyl-p-anilino-phenyl-p-phenylene-diamine, which has the structural formula:

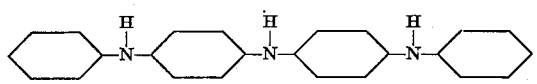

and is an effective age-resister of this class. Other compounds illustrative of this class are: dialkyl compounds such as dibenzyl-p-phenylene-diamine; aryl compounds such as diphenyl-p-phenylene-diamine, ditolyl-p-phenylene-diamine, phenyl-beta-naphthyl-p-phenylene-diamine, di-alpha-naphthyl-p-phenylene-diamine, and di-beta-naphthyl-p-phenylene-diamine; h y d r o x y substituted compounds such as hydroxy-phenyl-naphthyl-p-phenylene-diamine, and di(p-hydroxy-phenyl)-p-phenylene-diamine; amino substituted compounds such as diamino-diphenyl-p-phenylene-diamine and diamino-dinaphthyl-p-phenylene-diamine; compounds with a substituted nucleus, such as 2.5 di(phenylamino)-toluene, 1.4 diphenylamino-2 chlor-benzene, and diphenyl-p-benzophenylene-diamine; and phenyleneamine chains of the general structural formula:

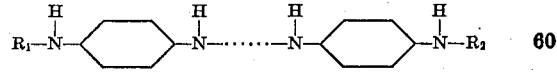

containing up to 6 amino groups connected by phenylene groups; as well as further alkyl, aryl, amino, hydroxy, nitro, nitroso or other substitution products of these compounds. However, acidic substituent groups such as —$SO_3H$ and —COOH tend to reduce the activity of the compound as an age-resister, as do substituents, other than alkyl and aryl groups and the halogens, when attached to the central nucleus.

These compounds are much more active age-resisters than substances heretofore used for that purpose in rubber. If used in a rubber composition in the same proportions as previously known age-resisters, they are far more effective in retarding deterioration, whereas small proportions of these compounds are as effective as much larger proportions of the previously known substances. They are odorless and do not impart an odor to a vulcanized rubber composition into which they have been incorporated. They have little or no effect on the curing properties of rubber stocks, hence they may be added to existing factory stocks without changing the behavior of these stocks during vulcanization. There is, therefore, no necessity for a laborious and expensive readjustment of vulcanizing agents or vulcanizing temperatures.

For example, any one of the class of disubstituted p-phenylene diamines hereinabove indicated may be incorporated into any unvulcanized rubber composition, preferably from 0.1 to 4 parts by weight of the substance to 100 parts of rubber being employed. The rubber may then be vulcanized in the same manner as if the age-resister were not added.

*Example 1.*—As a specific example of one embodiment of the process of this application, a typical tire tread composition was prepared, containing blended plantation rubbers 100 parts by weight, sulfur 5.5 parts, zinc oxide 30 parts, gas black 40 parts, mineral rubber 10 parts, palm oil 5 parts, and hexamethylene tetramine 0.75 parts.

The batch was divided into three parts; to the first two were added respectively 0.5 parts and 0.2 parts of diphenyl-p-phenylene-diamine, while the third part was used as a control. The compositions were thoroughly mixed, and cured in a press for 45 minutes at 294° F. to produce an optimum cure. The relative rate of aging of the cured compositions was determined by means of an accelerated aging test in which the tensile strength at the breaking point was compared before and after aging 7, 14 and 21 days in the Geer oven at 158° F. The results are shown in the following table:

*Tensile strength at breaking point in pounds per square inch*

| Exposure: Geer oven | Without diphenyl-p-phenylene-diamine | With 0.2 parts diphenyl-p-phenylene-diamine | With 0.5 parts diphenyl-p-phenylene-diamine |
|---|---|---|---|
| Before aging | 3812 | 3859 | 3834 |
| After 7 days | 2034 | 3520 | 3586 |
| After 14 days | 1063 | 2751 | 3150 |
| After 21 days | 847 | 2120 | 2775 |

*Tensile strength and elongation at breaking point*

| Parts age-resister added | Condition of surface after cure | Before aging | | After 48 hours in the bomb | | After 72 hours in the bomb | |
|---|---|---|---|---|---|---|---|
| | | Tensile strength | Elongation | Tensile strength | Elongation | Tensile strength | Elongation |
| None | Very tacky | 2882 | 753% | 181 | 155% | Melted | |
| 0.55 di-beta-naphthyl-p-phenylene-diamine | Slight tack | 3249 | 698% | 3024 | 737% | 2837 | 700% |
| 0.22 diphenyl-p-phenylene-diamine | Slight tack | 3698 | 750% | 3194 | 710% | 3006 | 670% |

*Example 2.*—As another specific example of the process of this application, rubber compositions similar to those given above were prepared, substituting phenyl-p-anilinophenyl-p-phenylene-diamine for the diphenyl-p-phenylene-diamine. The results of the tests of the vulcanized compositions before and after aging as above in the Geer oven are given in the following table:

*Tensile strength and elongation at breaking point*

| Exposure: Geer oven | Without phenyl-p-anilinophenyl-p-phenylene diamine | | With 0.5 parts phenyl-p-anilinophenyl-p-phenylene-diamine | |
|---|---|---|---|---|
| | Tensile strength | Elongation | Tensile strength | Elongation |
| Before aging | 3690 | 617% | 3785 | 627% |
| After 7 days | 1864 | 360% | 3509 | 498% |

*Example 3.*—As another specific example of the process of this application, rubber compositions similar to those given above were again prepared, but 0.5 parts of di-b-naphthyl-p-phenylene-diamine were substituted for the diphenyl-p-phenylene-diamine. The vulcanized compositions were tested before and after aging as above in the Geer oven, as well as in the Bierer-Davis aging bomb, in which the samples are maintained at 158° F. in an atmosphere of oxygen at a pressure of 300 lbs. per sq. in. The results are given in the following table:

*Tensile strength and elongation at breaking point*

| Exposure | Without di-b-naphthyl-p-phenylene-diamine | | With 0.5 parts di-b-naphthyl-p-phenylene-diamine | |
|---|---|---|---|---|
| | Tensile strength | Elongation | Tensile strength | Elongation |
| Before aging | 3822 | 633% | 3841 | 640 |
| After 7 days in Geer oven | 2156 | 433 | 2569 | 545 |
| After 48 hours in the Bierer-Davis bomb | 747 | 300 | 2900 | 580 |

*Example 4.*—As another specific example of the process of this application, crepe soling stocks were prepared consisting essentially of rubber 100 parts by weight, sulfur 3 parts, and zinc oxide 3 parts, accelerated so as to produce an optimum cure when cured in air at a temperature rising from 225° to 265° F. during one hour and maintained at 265° F. for one and one-half hours. One of these stocks was used as a control. To the others were added respectively 0.55 parts di-beta-naphthyl-p-phenylene-diamine, and 0.22 parts diphenyl-p-phenylene-diamine. The results of the tests of the vulcanized compositions, before and after aging in the Brierer-Davis bomb as in the previous example, are shown in the following table:

From these examples it is evident that the disubstituted p-phenylene-diamines are extremely effective in retarding the deleterious action normally incident to the aging of rubber.

Inasmuch as the compounds of this class are very effective in preventing resinification and the development of tack in crude rubber, they may be added to the rubber latex in the form of a fine powder or aqueous dispersion before co-agulation or may be milled into the coagulated crude rubber. Rubber so treated may be stored for much longer periods than untreated rubber, without the development of surface tack.

Age-resisters of this class may also be formed in the rubber before or during vulcanization, by the condensation or reaction of the materials required to form the age-resisting compound, such materials being incorporated in the rubber prior to vulcanization.

The disubstituted p-phenylene-diamines may also be applied to unvulcanized or vulcanized rubber with good effect on the age-resisting properties of the rubber, such as by applying them to the surface of the rubber, as for example in solution, or in the form of a powder, paste, or suspension.

Aryl substituted naphthylene diamines such as the 1.4 dianilino naphthalene, which is designated hereinabove as "diphenyl-p-benzophenylene-diamine" for the purpose of emphasizing its relationship to the para-phenylene diamine derivatives, are claimed in my copending application Serial No. 674,040 filed June 2, 1933. Aliphatic substituted phenylene diamines such as the dialkyl and dibenzyl p-phenylene diamines disclosed herein are claimed in my application Serial No. 674,041; and derivatives of diaryl p-phenylene diamines containing hydrocarbon substituents on the aromatic rings such as the ditolyl p-phenylene diamine and 2.5 di-(phenylamino)-toluene disclosed herein are claimed in my application Serial No. 674,042; both filed June 2, 1933.

It is to be understood that the term "treating" as employed in the appended claims is used in a generic sense to include either the incorporation of the disubstituted p-phenylene-diamines into the rubber by milling or similar process, or to the application thereof to the surface of a mass of crude or vulcanized rubber. The term "rubber" is likewise employed in the claims in a generic sense to include caoutchouc, balata, gutta percha, rubber isomers, and like products, whether or not admixed with fillers, pigments, vulcanizing or accelerating agents. The term "p-phenylene-diamine" is likewise employed in the claims in a generic sense to include p-toluylene-diamine-p-xylylene-diamine, chlor-p-phenylene-diamine, benzo-p-phenylene-diamine, and similar compounds. The term "aromatic ring" is employed in the usual sense to denote a benzene nucleus, whether or not the hydrogen atoms of the benzene have been replaced by other radicals, and whether or not it forms a part of a condensed ring system such as the naphthalene nucleus. Each naphthyl group is therefore considered as containing two aromatic rings.

I claim:

1. The method of preserving rubber which comprises treating rubber with a substance selected from a class consisting of the diaryl-p-phenylene-diamines, at least one of the aryl groups being a naphthyl group, the two aryl groups being attached to different nitrogen atoms.

2. The method of preserving rubber which comprises treating rubber with a substance selected from a class consisting of phenyl-alpha-naphthyl-p-phenylene-diamine, phenyl-beta-naphthyl-p-phenylene-diamine, di-alpha-naphthyl-p-phenylene-diamine, and di-beta-naphthyl-p-phenylene-diamine, the aryl groups being attached to different nitrogen atoms.

3. The method of preserving rubber which comprises treating rubber with symmetrical di-beta-naphthyl-p-phenylene-diamine.

4. The method of producing an age-resisting rubber composition which comprises incorporating into said composition before vulcanization a substance selected from a class consisting of diaryl-p-phenylene-diamines and substitution products thereof, the aryl groups being attached to different nitrogen atoms and at least one of the aryl groups containing more than one aromatic ring.

5. The method of producing an age-resisting rubber composition which comprises incorporating symmetrical di-beta-naphthyl-p-phenylene-diamine into said composition before vulcanization.

6. The method of preserving rubber which comprises adding symmetrical di-beta-naphthyl-p-phenylene-diamine to the rubber latex before coagulation.

7. The method of preserving unvulcanized rubber which comprises incorporating into the rubber symmetrical di-beta-naphthyl-p-phenylene-diamine.

8. The method of preventing the development of a tacky surface on rubber compositions during a dry heat or air cure which comprises treating rubber before cure with symmetrical di-beta-naphthyl-p-phenylene diamine.

9. A composition of matter comprising rubber and a substance selected from a class consisting of disubstituted p-phenylene-diamines, the substituents being attached to different nitrogen atoms and at least one of the substituents comprising a naphthyl group.

10. A composition of matter comprising rubber and symmetrical di-beta-naphthyl-p-phenylene-diamine.

11. A rubber product resulting from the vulcanization of a rubber composition comprising a vulcanizing agent, an accelerator, and symmetrical di-beta-naphthyl-p-phenylene-diamine.

12. The method of preserving rubber which comprises treating rubber with a substance selected from the class consisting of N, N' disubstituted p-phenylene diamines containing more than three but not more than seven aromatic rings, and neutral or basic substitution products of such compounds.

13. The method of preserving rubber which comprises treating rubber with a substance consisting of a chain of one or more p-phenylene groups disposed between terminal aryl groups and connected thereto and to each other by amino groups, the said substance containing more than three but not more than seven aromatic rings.

14. The method of preserving rubber which comprises treating rubber with an N, N' diaryl p-phenylene diamine in which at least one of the aryl groups contains more than one aromatic ring.

15. A composition of matter comprising rubber and an N, N' disubstituted p-phenylene diamine containing more than three but not more than seven aromatic rings, and neutral or basic substitution products of such compounds.

16. A composition of matter comprising rubber and a substance consisting of a chain of one or more p-phenylene groups disposed between terminal aryl groups and connected thereto and to each other by amino groups, the said substance containing more than three but not more than seven aromatic rings.

17. A composition of matter comprising rubber and an N, N' diaryl p-phenylene diamine in which at least one of the aryl groups contains more than one aromatic ring.

18. A composition of matter comprising rubber and an N, N' diaryl p-phenylene diamine in which at least one of the aryl groups is a naphthyl group.

19. The method of preserving rubber which comprises adding to rubber latex before coagulation thereof an N, N' disubstituted p-phenylene diamine in which at least one of the substituents contains more than one aromatic ring.

20. The method of preserving rubber which comprises treating rubber with phenyl beta-naphthyl p-phenylene diamine.

21. The method of preserving rubber which comprises treating rubber with phenyl p-anilino phenyl p-phenylene diamine.

22. A composition of matter comprising rubber and phenyl beta-naphthyl p-phenylene diamine.

23. A composition of matter comprising rubber and phenyl p-anilinophenyl p-phenylene diamine.

WALDO L. SEMON.